United States Patent
Moody et al.

(10) Patent No.: US 6,859,927 B2
(45) Date of Patent: *Feb. 22, 2005

(54) APPARATUS AND METHOD FOR CONTROLLING ALLOCATION OF RESOURCES AND TASK EXECUTION

(75) Inventors: John O. Moody, Vestal, NY (US); Ira Glickstein, Apalachin, NY (US); Robert Szczerba, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 744 days.

This patent is subject to a terminal disclaimer.

(21) Appl. No.: 09/740,418

(22) Filed: Dec. 19, 2000

(65) Prior Publication Data

US 2005/0005272 A1 Jan. 6, 2005

Related U.S. Application Data

(60) Provisional application No. 60/172,805, filed on Dec. 21, 1999.

(51) Int. Cl.[7] .................................................. G06F 9/00
(52) U.S. Cl. ........................ 718/100; 718/102; 718/104
(58) Field of Search ................................. 718/100, 102, 718/104, 106

(56) References Cited

U.S. PATENT DOCUMENTS

| | | | |
|---|---|---|---|
| 3,614,745 A | 10/1971 | Podvin et al. ............ 340/172.5 |
| 4,914,570 A | 4/1990 | Peacock ..................... 364/200 |
| 4,949,254 A | 8/1990 | Shorter ....................... 364/200 |
| 5,053,950 A | 10/1991 | Naganuma et al. ......... 364/200 |
| 5,057,996 A | 10/1991 | Cutler et al. ................ 364/200 |
| 5,088,034 A | 2/1992 | Ihara et al. ................. 395/700 |
| 5,109,510 A | 4/1992 | Baker et al. ................ 395/650 |
| 5,241,677 A | 8/1993 | Naganuma et al. ......... 395/650 |
| 5,255,181 A | 10/1993 | Chapman et al. ........... 364/401 |
| 5,283,896 A | * 2/1994 | Temmyo et al. ............ 718/104 |
| 5,289,370 A | 2/1994 | Lirov .......................... 364/401 |
| 5,392,430 A | 2/1995 | Chen et al. ................. 395/650 |
| 5,408,663 A | 4/1995 | Miller ......................... 395/650 |
| 5,513,354 A | 4/1996 | Dwork et al. ............... 395/650 |
| 5,522,070 A | 5/1996 | Sumimoto ................... 395/650 |
| 5,546,594 A | 8/1996 | Wazumi ..................... 395/800 |
| 5,671,360 A | 9/1997 | Hambrick et al. .......... 395/209 |
| 5,734,837 A | 3/1998 | Flores et al. ................ 395/207 |
| 5,745,687 A | 4/1998 | Randell ................. 395/200.31 |
| 5,748,468 A | 5/1998 | Notenboom et al. ........ 364/132 |
| 5,764,543 A | 6/1998 | Kennedy .................... 364/578 |
| 5,768,538 A | 6/1998 | Badovinatz et al. ... 395/200.78 |

(List continued on next page.)

OTHER PUBLICATIONS

D. P. Bertsekas, "The Auction Algorithm: A Distributed Relaxation Method for the Assignment Problem", *Annals of Operations Research* 14 (1988) 105–123.

(List continued on next page.)

*Primary Examiner*—Meng-Al T. An
*Assistant Examiner*—Li Zhen
(74) *Attorney, Agent, or Firm*—Tarolli, Sundheim, Covell & Tummino L.L.P.

(57) ABSTRACT

A distributed data processing system and method are presented herein for purposes of controlling allocation of resources and task execution. The system includes a communication network that passes messages between computers connected to the network. A plurality of computers are connected to the network and run programs thereon including a central authority and at least first and second autonomous agents. The central authority generates a graph associated with each agent and wherein each graph represents for the associated agent what resources that agent has and what task or tasks that agent may perform. Each agent employs the associated graph to determine what resource or resources are needed by that agent to carry out the task of tasks to be performed by that agent. The agents negotiate with each other for the resources needed to carry out the task or tasks to be performed by the agents.

41 Claims, 13 Drawing Sheets

U.S. PATENT DOCUMENTS

| | | | | |
|---|---|---|---|---|
| 5,787,283 | A | | 7/1998 | Chin et al. .................. 395/701 |
| 5,819,270 | A | | 10/1998 | Malone et al. ................. 707/7 |
| 5,836,011 | A | | 11/1998 | Hambrick et al. .......... 395/208 |
| 5,881,238 | A | | 3/1999 | Aman et al. ................ 395/200 |
| 5,960,404 | A | | 9/1999 | Chaar et al. .................... 705/8 |
| 5,963,911 | A | | 10/1999 | Walker et al. ................. 705/7 |
| 6,088,732 | A | * | 7/2000 | Smith et al. ................ 709/229 |
| 6,263,358 | B1 | * | 7/2001 | Lee et al. ................... 718/100 |

OTHER PUBLICATIONS

D. Chen, R. Szczerba, and J. Urban Jr. "A Framed–Quadtree Approach for Determining Euclidean Shortest Paths in a 2–D Environment," *IEEE Transactions on Robotics and Automation,* vol. 13, No. 5, pp. 668–681, Oct. 1997.

O. E. Drummond, D. A. Castanon, M. S. Bellovin, Comparison of 2–D Assignment Algorithms for Sparse, Rectangular, Floating Point, Cost Matrices, *Journal of the SDI Panels on Tracking,* Institute for Defense Analyses, Alexandria, VA, Dec. 15, 1990.

L. Holloway, B. Krogh, and A. Giua, "A Survey of Petri Net Methods for Controlled Discrete Event Systems", Discrete Event Dynamic Systems: Theory and Applications, vol. 7, No. 2, pp. 151–190, Apr., 1997.

M. Iordache, John O. Moody, "Synthesis of Deadlock Prevention Supervisors Using Petri Nets", IEEE Transactions on Robotics And Automation, vol. 18, No. 1, Feb. 2002.

H. W. Kuhn, "The Hungarian Method for the Assignment Problem", *Naval Research Logistics Quarterly 2* (1955) 83–97.

J. Moody and P. Antsaklis, "Petri Net Supervisors for DES with Uncontrollable And Unobservable Transitions", IEEE Transactions on Automatic Control, vol. 45, No. 3, Mar. 2000.

T. Murata, "Petri Nets: Properties, Analysis, and Applications", *Proceedings of the IEEE,* vol. 77, No. 4, pp. 541–580, 1989.

A. B. Poore, N. Rijavec, M. Liggins, V. C. Vannicola, "Data Association Problems Posed as Multidimensional Assignment Problems: Problem Formulation", SPIE Proceedings, vol. 1954 (1993) 552–563.

A. B. Poore, N. Rijavec, T. N. Barker, M. Munger, "Data Association Problems Posed as Multidimensional Assignment Problems: Numerical Simulations", SPIE Proceedings, vol. 1954 (1993) 564–573.

P. Ramadge and W. Wonham, "The Control of Discrete Event Systems", *Proceedings of the IEEE,* vol. 77, No. 1, pp. 81–97, 1989.

H. Samet, "An Overview of Quadtrees, Octrees, and Related Hierarchical Data Structures," *NATO ASI Series,* F40:51–68, 1988.

* cited by examiner

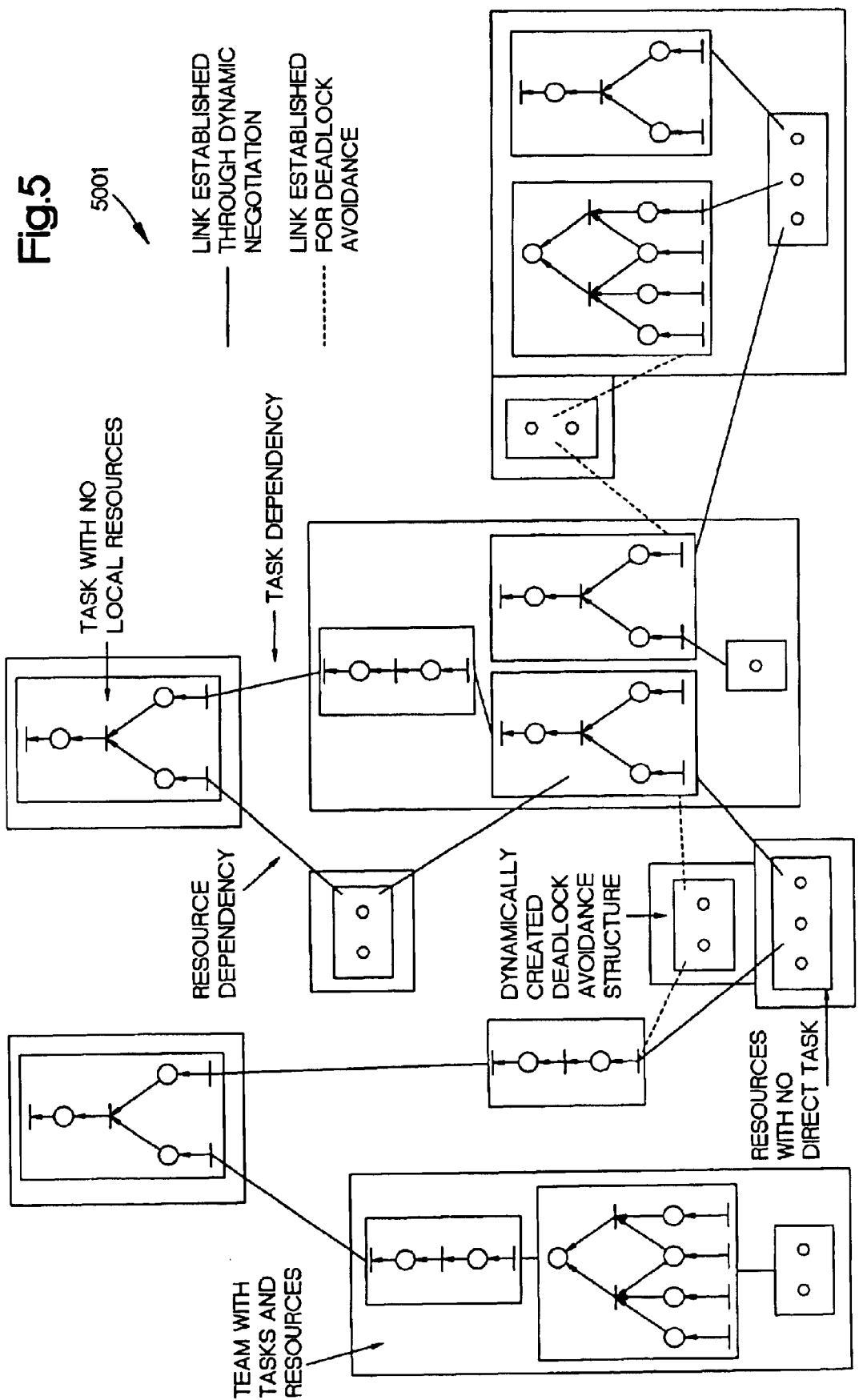

APPARATUS AND METHOD FOR CONTROLLING ALLOCATION OF RESOURCES AND TASK EXECUTION

This application claims the benefit of 60/172,805 filed Dec. 21, 1999.

BACKGROUND OF THE INVENTION

1. Field of Invention

The present invention relates to apparatus and method for controlling allocation of resources directed toward performing tasks.

2. Description of Related Prior Art

Frequently, real world applications involve the actions of multiple (semi-) autonomous units or teams, engaged in tasks directed toward the achievement of common goals, sharing a limited supply of essential resources, and operating in a dynamic, changing environment. Each member of a team has resources that may be required to complete tasks and/or has the ability to execute tasks given the necessary resources. Logistics is a prime example of one such application, but examples also include process control and flexible manufacturing in industry, commerce and quality in economics, and autonomous control and distributed robotics in engineering research. At the highest level, these problems are generally solved by hand based on human intuition and experience. Some algorithms and procedural techniques exist to help solve lower level components of the bigger problems.

The problems of resource negotiation, allocation, and general logistics are applicable to most industries. These include the military, manufacturers, and trading and commerce organizations. The problems are also important in engineering research areas such as robotics, artificial intelligence, autonomous control, and operations research.

SUMMARY OF THE INVENTION

It is therefore an object of the present invention to provide an architecture and method designed to handle autonomous negotiations and dynamic team formation throughout the lifetime of a mission.

It is a more specific object of the present invention to provide an architecture and method in which teams and resource dependencies emerge as a result of the algorithm flow, and the architecture is equipped to modify these facets based on new information that becomes available during mission execution.

It is an additional object of the present invention to provide an architecture and method of the type described in which team members are capable of negotiating among themselves and performing their tasks autonomously, i.e., their actions during mission execution need not be coordinated by a central authority.

It is a further specific object of the present invention to provide an architecture and method and of the type described in which the central authority may make strategic decisions that affect the basic behavior of the teams, but all tactical decisions are performed at the unit and team level.

In accordance with one aspect of the present invention, a distributed data processing system is provided for controlling allocation of resources and task execution. This system includes a communications network that passes messages between computers connected to the network. A plurality of computers are connected to the network and run programs thereon including a central authority and at least first and second autonomous agents. The central authority generates a graph associated with each agent and wherein each graph represents for the associated agent what resources that agent has and what task or tasks that agent may perform. Each agent employs the associated graph to determine what resource or resources are needed by that agent to carry out the task or tasks to be performed by that agent. The agents negotiate with each other for the resources needed to carry out the task or tasks to be performed by the agents.

In accordance with another aspect of the present invention, a method is provided and wherein the method is operative in a distributed data processing system for controlling allocation of resources and task execution. The method employs a communication network that passes messages between computers connected thereto and the computers are operative to run programs thereon including a central authority and at least first and second autonomous agents. The method includes the steps of generating, at the central authority, a graph associated with each agent that represents for that agent what resources that agent has and what task or tasks that agent may use the resources for. Another step involves each agent employing the associated graph to determine what resource or resources are needed by that agent to carry out the task or tasks to be performed by that agent. Another step involves the agents negotiating with each other for the resources needed to carry out the task or tasks to be performed by the agents.

In accordance with a still further aspect of the present invention a computer program product operative in a system as set forth above is provided and wherein the product includes a central authority and first and second autonomous agents.

BRIEF DESCRIPTION OF THE DRAWINGS

The foregoing and other advantages of the invention will become more readily apparent from the following description of a preferred embodiment of the invention as taken in conjunction with the accompanying drawings, which are a part hereof, and wherein:

FIG. 5 illustrates a still further PN graph useful in describing the invention herein;

DESCRIPTION OF EXAMPLE EMBODIMENTS

Figure 1:
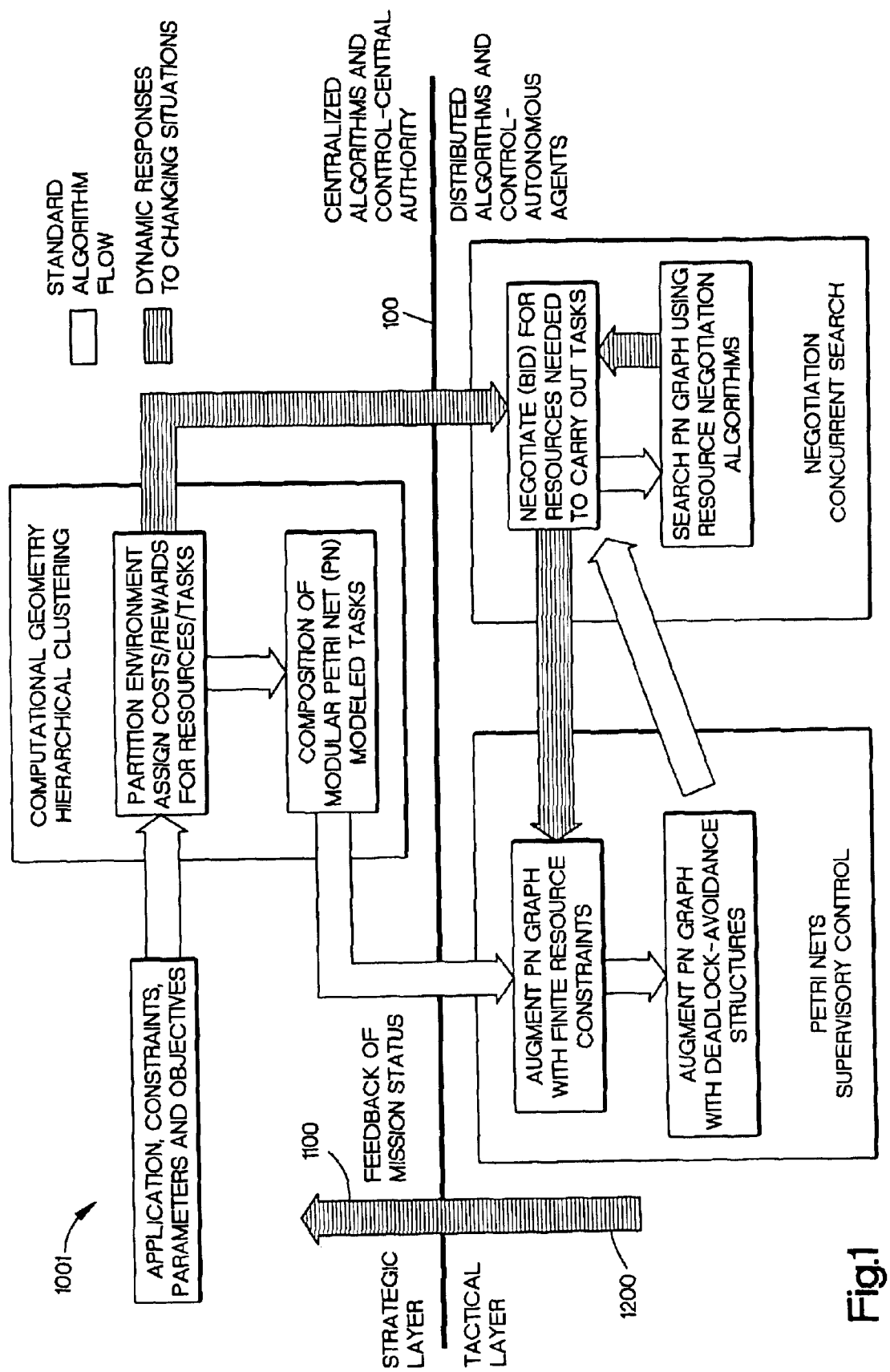
FIG. 1 is an illustration showing high level architecture and algorithm flow involved in the invention herein.

An architecture is presented herein that supports autonomous planning, resource allocation, and task execution for teams of independent entities operating in dynamic, changing environments. A scalable, distributed network of modular team task descriptions and resource dependencies is created and managed in real time. Initially, teams are composed of units possessing resource and/or potential task execution assets. Automatic synthesis techniques are employed to create feasible inter-team links of dependency among tasks and resources. This step provides a framework for goal-directed decision making and task planning by human-managed or cybernetic reasoning systems. New higher level cooperating teams arise as an emergent phenomenon of these processes. The scalability and distributed nature of the architecture allows the network to be dynamically modified as tasks are accomplished, goals shift, and new environmental conditions are encountered. The architecture has a wide range of applications, in the areas of logistics, flexible manufacturing, process control, autonomous distributed robotics, economics, or any area in which resources are produced and consumed in the goal-directed execution of tasks.

A great number of real world applications involve the actions of multiple (semi-) autonomous units or teams, engaged in tasks directed toward the achievement of common goals, sharing a limited supply of essential resources, and operating in a dynamic, changing environment. Logistics is a prime example of one such application, but examples also include process control and flexible manufacturing in industry, commerce and quality in economics, and autonomous control and distributed robotics in engineering research. At the highest level, these problems are generally solved by hand based on human intuition and experience. Some algorithms and procedural techniques exist to help solve lower level components of the bigger problems. It is desired to present a technical architecture that, when implemented, would serve as a powerful aid for human decision makers or serve as the central nervous system of a completely autonomous collection of cybernetic decision makers, Autonomous Negotiating Teams (ANT). A complete, practical architecture for autonomous resource negotiations in dynamic environments should have the following properties:

Scalable architecture and flexible algorithm set

Robust coordination through unit-level negotiations

Real-time reorganization in case of dynamic situation changes

Insensitivity to loss of communications, local autonomy

An ANT architecture is presented herein that provides for these characteristics in a practical, achievable manner. The ANT architecture involves a unique set of diverse research areas combined to achieve both robustness to disruption of the command hierarchy and allocation efficiency superior to the current state of the art. It provides a distributed solution to resource allocation and hierarchical task execution problems. The resource allocation problem description, constraints, and objectives are broadcast to ANT processors in the field. Individual teams may perform certain tasks and/or hold resources needed for their own tasks or for the tasks of other teams. Using only limited two-way communications, teams begin negotiating among themselves for the resources needed to complete their tasks. Links of dependency are dynamically created between teams, and supervisory control algorithms insure that these dependencies will not interfere with the completion of the objectives. Teams allocate and share resources, plan and execute tasks in accordance with the problem constraints and objectives. Unexpected changes in the environment or modified global directives will initiate dynamic recalculations and modifications to ANT behavior.

A solution is presented herein that partitions the environment and problem spaces and composes the tasks and processes within a dynamic, modular discrete event system framework. Resource allocation problems are solved using a combination of supervisory control, assignment algorithms, remote autonomous agents and pseudo-centralized planning.

FIG. 1 illustrates an example ANT system architecture 1001. Domain expertise and knowledge regarding the particular problem constraints and objectives are input at the start of the solution. Techniques from computational geometry and hierarchical clustering are used to partition the problem space and assign resource costs and objective rewards. Knowledge representing task flow and resource requirements are composed as Petri net (PN) discrete event systems and relayed to individual, possibly remote, ANT processors. Each ANT processor then accounts for its resource requirements by automatically augmenting its PN task description models using techniques from supervisory control. This step includes an algorithm for deadlock avoidance to insure that the possible paths through the graph will not prohibit the completion of other crucial objectives.

Individual teams may have the knowledge or tools required to complete tasks or satisfy objectives without all of the necessary resources, or they may hold resources for which they have no immediate associated task. Remote autonomous agents assigned to each team will then initiate local two-way communications to negotiate for the resources needed for task completion. This negotiation employs distributed implementations of computationally efficient assignment algorithms using the normalized costs and rewards provided by the environmental partitioner at the start of the algorithm. Requests for resources may be passed along chains of local communication to enable cooperation among isolated teams. Agreements reached through negotiations will result in the dynamic creation of new links of dependency throughout the distributed PN graph structure. Negotiations will employ pseudo-centralized planning making them capable of achieving superior results compared to completely localized negotiation schemes and making them less sensitive to interruptions in communication.

Once agreements have been finalized regarding the interdependency of resources and tasks, each team employs intelligent algorithms to search the PN graph for "good enough, fast enough" paths to the mission objectives. During mission execution, teams may experience setbacks or become aware of changed environmental conditions. This information is used to initiate new resource negotiations and further modifications to the interdependent graph structure. Thus the teams dynamically respond to changing environments and continue to execute their tasks and meet the mission objectives without interference from a centralized planner. The central plan ner may also make strategic decisions and initiate dynamic changes in the teams' behavior by broadcasting new tasks or simply by modifying the costs and rewards associated with resource consumption and objective completion. The decisions of the central authority are strictly strategic: it is never required to micromanage the activities of the ANTs. All tactical decisions, including the details of negotiation, are left to the teams.

Figure 2:
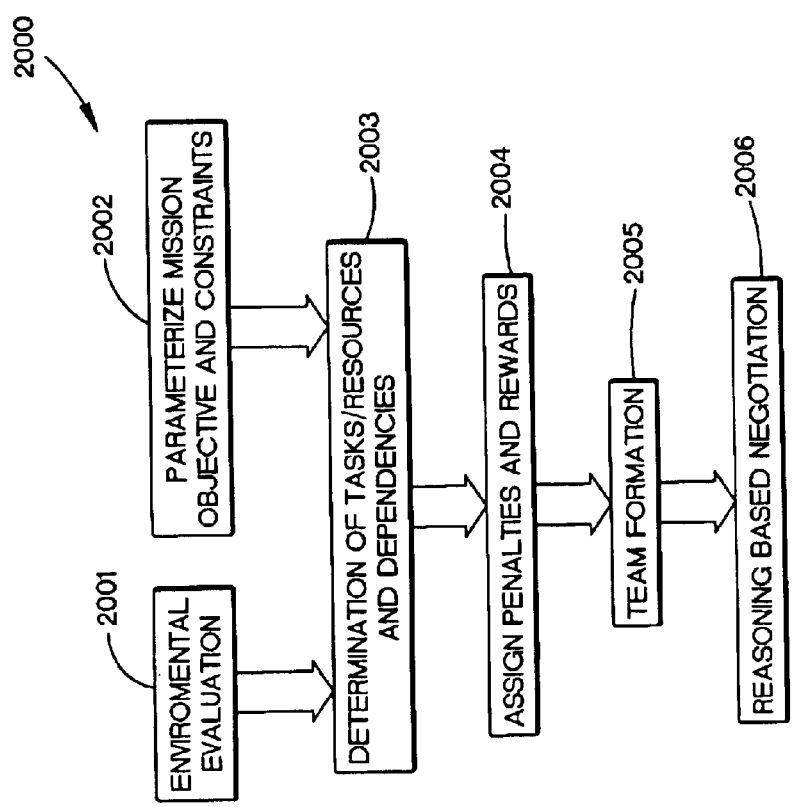
FIG. 2 is a flow diagram illustrating a portion of the invention herein.

Given a particular mission and objective, there are a number of steps that may be performed before any autonomous negotiation between teammates can occur. An outline of these steps appears in FIG. 2. Obviously, different scenarios require different inputs, constraints, and task descriptions, though the underlying concepts are similar. FIG. 2 provides a general description 2000 of the components that are common to most scenarios.

The first set-up task is to accurately and efficiently evaluate the mission environment 2001. This consists of intelligently partitioning the environment locations in discrete regions representing different mission-dependent features. Different cost values are assigned to these areas, indicating a relative "cost" of traversing an area or a "reward" indicating the importance of accomplishing a partial mission objective. Any time, these features may be dependent on some sort of probabilistic or temporal function (e.g., a threat location may be known with a limited degree of certainty, or the desirability of a particular location may decrease after a specific duration). The architecture supports the constant introduction of new information, so information on the environment must be gathered and stored in such a way to make it easily accessible as well as easily modified in real-time. There are a number of unique data structures that aid in accurately partitioning the environment.

Once the environment has been evaluated, the mission objectives and implied constraints may be explicitly stated 2002. Various success criteria representing quantitative measures are applied to evaluate how close a unit or team is to completing the stated objectives.

Once the success criteria have been determined, the various tasks required to reach these objectives are defined 2003. This is a difficult task; the ANT architecture tackles it with a "divide and conquer" approach. For each mission scenario, a number of specific high-level tasks for ANT agents are defined as well as the specific resources (or resource combinations) that are required for each task. For these high-level task descriptions, detailed sub-tasks are defined to perform the higher-level tasks. Required and desired resources are associated with each of these tasks and sub-tasks. A complete dependency list is then generated to link resources, tasks, and sub-tasks together.

Once the task (and subtask) dependencies and resources have been determined, relative penalties and rewards are assigned 2004. This is required because any two tasks may require similar resources but may not be equally desirable when evaluating them against overall goals.

Low-level teams are formed to perform the tasks required to achieve mission goals 2005. Higher-level teams may dynamically emerge as the result of autonomous negotiations. Teams may be dynamically formed based on spatial locality or functionality (agents within the same geographic area, agents with similar duties or capabilities, or a combination of these two). A number of different hierarchical structures may be used to represent the various teammates and associated command structure. After each of these critical tasks are performed, the ANTs are ready to begin dynamic negotiations for resources in the pursuit of mission objectives 2006.

Discrete event systems (DES) are dynamic system models with state changes driven by the occurrence of individual events. DES may be used to provide a logical framework for handling the complex interrelationship between resource allocation, resource consumption, and task-flow, and are thus an integral component of ANT architecture.

It is often necessary to regulate or supervise the behavior of these systems to include the constraints caused by a finite number of shared resources or to meet safety or performance criteria, e.g., insuring that resources are not allocated in such a way that it is impossible for any consumer to complete its given task. DES supervisors are used to insure that the behavior of the system does not violate a set of constraints under a variety of operating conditions. The regulatory actions of the supervisor are based on observations of the system state, resulting in feedback control. The process of preventing certain undesirable behaviors while otherwise allowing the system to evolve freely is known as supervisory control.

It is common to see DES modeled as finite automata. Methods exist for designing controllers based on automaton system models, however these methods often involve exhaustive searches or simulations of system behavior, making them impractical for systems with large numbers of states and transition causing events. One way of dealing with these problems is to model DES with Petri Nets.

Figure 3A:
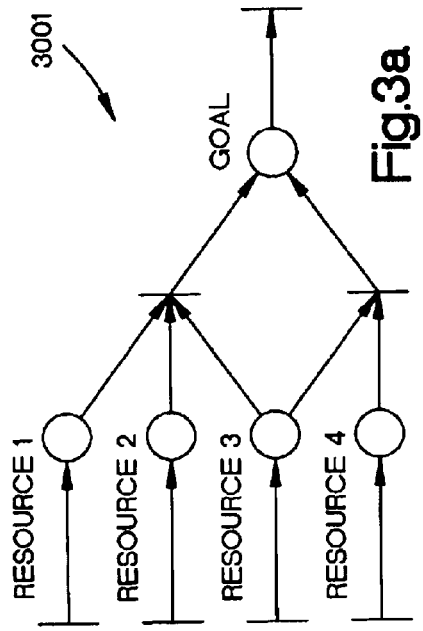
FIG. 3 which is comprised of FIGS. 3A and 3B illustrate Petri Net (PN) representing resource-using tasks useful in describing the invention herein.

Petri nets (PN) are a powerful and efficient DES model that incorporate the synchronization, conflict, and concurrency issues associated with the distributed, dynamic resource allocation problem of ANTs. They have a mathematical representation employing linear matrix algebra making them particularly useful for analysis and design. FIG. 3A shows an example of a PN model 3001 used to represent a sequence of states required to complete a task. Note that the final goal can be reached by using either resource 1 and 2 or resource 4, however resource 3 is required in both solutions.

Figure 3B:
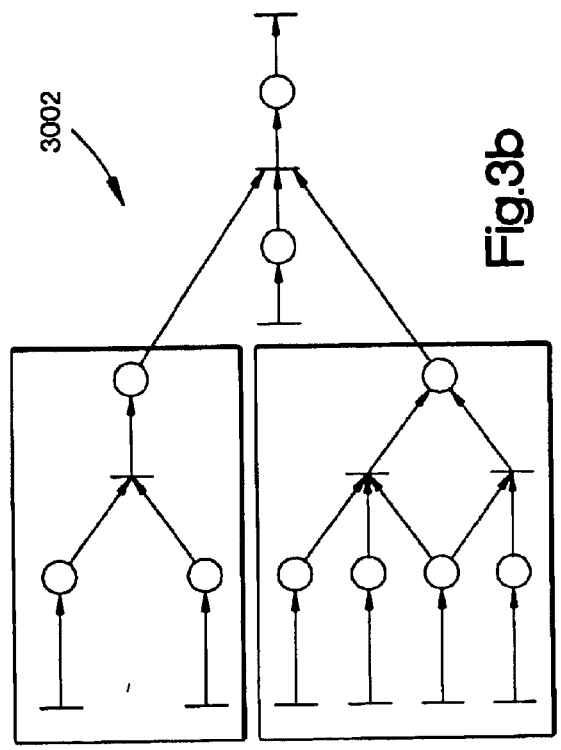

PN's representing simple task flows may be composed to form high-level, hierarchical task descriptions. PN's facilitate a modular approach to the composition of processes. Hierarchical and inter-dependent relationships can easily be established starting with an initial set of simple but modular task descriptions. FIG. 3B shows a sample composition 3002.

Often times the graphical representation of a system as a PN model is enough for an engineer to design a controller for the plant. Many control techniques exist that involve recognizing and then manipulating certain structures and situations that commonly appear in PN models. Other techniques exist for automatically verifying the reliability of these control designs. Representing the controller itself as a PN makes the verification of the combined plant/controller system simpler and reduces the number of computational tools required to model the overall system. Unfortunately, even when the controller is modeled as a PN, this cyclic technique of design and verification can become quite cumbersome when the domain model is large. The ANT architecture employs automated techniques for synthesizing controllers based on the system model and constraint data.

Figure 4B:
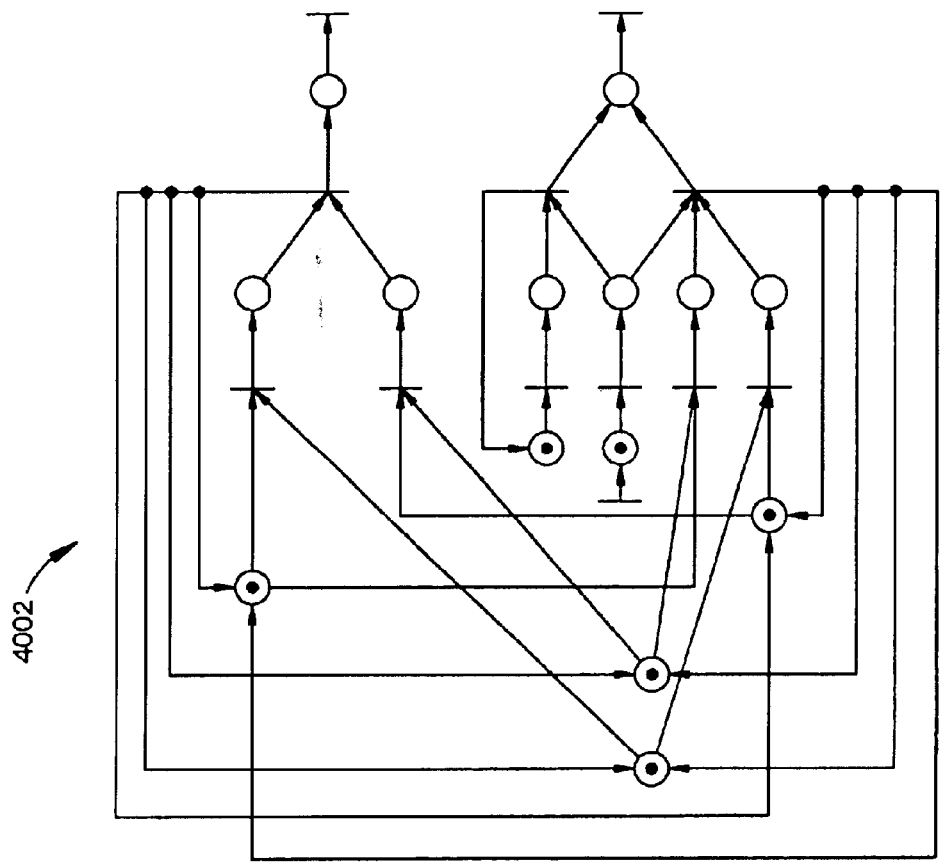
FIG. 4 which is comprised of FIGS. 4A and 4B illustrates more detailed PN graphs useful in describing the invention herein.
Figure 4A:
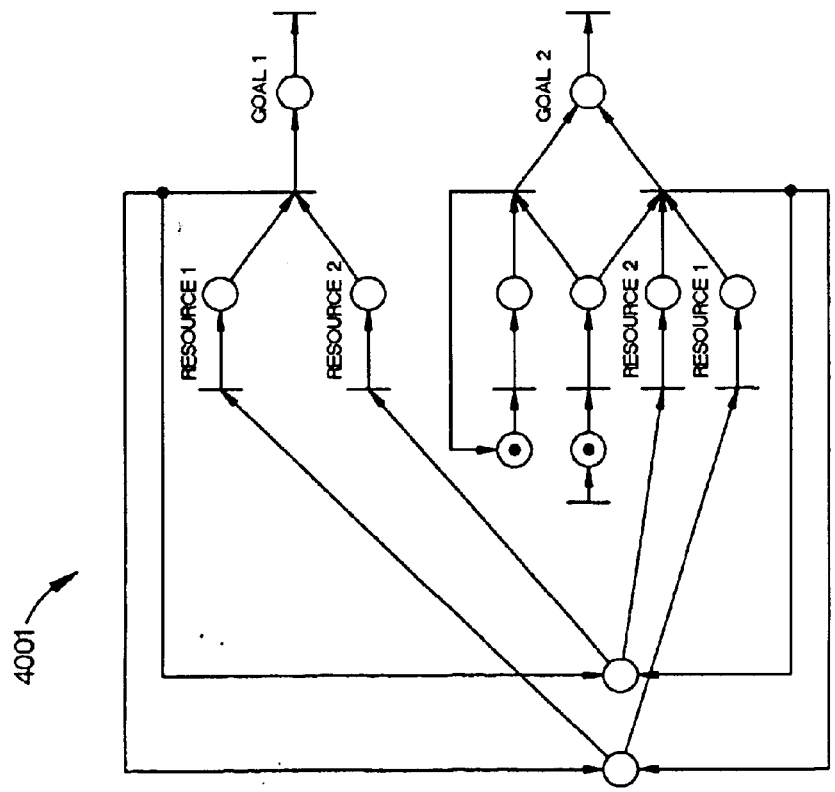

Invariant based controllers augment PN graphs with complex resource sharing constraints using scalable, computationally efficient calculations. FIG. 4($a$) shows an example of two, potentially concurrent, tasks 4001. Either task may make use of Resource 1 or 2. Constraints relating to the number of available finite resources are then added to the system. For example, there may be only one of each of Resources 1 and 2 available for the two missions. Using a PN supervisory control technique known as invariant based control, a mathematical representation of the resource constraints is automatically converted into controlling PN structures using an extremely efficient linear matrix calculation. The emboldened places in FIG. 4a represent the supervisor that was synthesized using invariant based control. The tokens in these places represent the availability of a given finite resource. This automatic resource management technique can be used to model expendable resources like fuel and money, and reusable resources like equipment and manpower.

Note that the model 4001 in FIG. 4a incorporates undesirable solutions, for example, Resource 1 may be allocated to Goal 1, while simultaneously Resource 2 is allocated to Goal 2. This situation will result in a local deadlock, i.e., two transitions within the PN become "dead." This condition is avoided by the implementation of deadlock-avoidance/liveness-enforcement techniques. A solution 4002 to this problem is shown in FIG. 4b, the darkened places represent the new liveness-enforcing control structures. The solution 4002 was automatically synthesized using PN deadlock-avoidance algorithms.

Employing structural techniques for incorporating deadlock avoidance into the PN graph will automatically prune many infeasible solutions from the problem search space. Incorporating resource management and deadlock avoidance into the PN model provides a searchable graph that will not allow paths that lead to infeasible solutions. That is, an algorithm searching through states of the PN, looking for good resource allocation solutions, will not waste any of its time eliminating paths that use too many resources or lead to deadlock. The PN graph structure and set of reachable PN states have already eliminated these infeasible solutions from the search.

TABLE 1

Features of Negotiation Algorithms

| Algorithmic Feature | Advantage | Benefit |
| --- | --- | --- |
| Auction-based | Highly parallelizable, and may be distributed | Supports autonomous team operations |
| Dynamic epsilon | Auction starts fast, then refines assignments | Rapid response to dynamic changes |
| JVC algorithm | Combines rapid start auction with modified Munkries for rapid finish | Real-time, high quality resource assignments |
| Lagrangian relaxation | Supports multidimensional assignment | Flexibly modifies initial assignments when needs change over time |

Resource negotiation between teams employs distributed bidding techniques using remote autonomous agents and is robust to communication failures through pseudo-centralization. Remote Autonomous Agents allow each resource consumer to dispatch intelligent agents to take up residence and execute on computers at remote resource supplier and consumer nodes.

These agents bid against others on resources that may be available at those nodes and the (possibly constrained) highest bidder obtains the resource, or the resource is divided in proportion to the bids. The agents perform the communication and negotiations, and inform their owners of resource availability and allocations.

The environmental partitioner/central planner may establish the governing parameters of the bidding. It will create the initial team groupings and task representations, assign costs to resources and awards for task completion, and establish a normalization scheme for the bidding.

The actual bidding and assignment of resources may be carried out using a combination of several auction-based algorithms. The "assignment problem" of associating a stream of observations from multiple sensors to target tracks in real-time has been addressed and largely solved by a variety of algorithms.

An exhaustive solution (e.g., the Munkres algorithm) would require enumeration of all combinations of sets of pairings, which, for a large number of items, would be computationally infeasible. Much work has been done to reduce the computational time for real-time results. The "Hungarian method" is an example of a way to reduce computational complexity. The "JVC algorithm" is an example of a method that is based on a combination of "auction" and "modified Munkres". "Lagrangian relaxation" has been used to support multidimensional assignment.

The "auction" consists of several rounds of bidding. In the first round, supply items (rows) are offered at different prices to the first choice (highest profit) column on the basis of cost and the lower profit that would be obtained from the second choice. This results in an initial assignment. Successive rounds of bidding may change the initial assignments, but, to prevent endless oscillation and assure that there will not be infinite rounds of bidding, an epsilon factor is added to the bid at each round. Larger values for epsilon yield faster results but reduce overall performance. Some methods dynamically vary the value of epsilon, to achieve initial results rapidly, but then repeat the process to improve the quality of the assignments. It is also possible that the negotiation scheme may change dynamically based on changing environmental conditions such as reduced communication capability. The procedures above have been described as a centralized solution, however an advantage of auction-based methods is that they are highly parallelizable, and may be implemented by semi-independent computations on processors at each supplier and consumer entity. So long as each processor bids according to the same algorithm and the same relative value for price and cost, based on norms and instructions from higher authority, they need only exchange bids for the system to work. A kind of pseudo-centralized planning will result, where the use of physically distributed ANT agents employing communications to negotiate according to the rules of the more centralized auction algorithms will provide the coordination and performance benefits of centralization with the speed and robustness of distributed processing.

Successful negotiations will result in logical links between the modular PN graphs of the various teams. The proper links and additional structures for performing deadlock avoidance will be automatically synthesized using techniques from supervisory control. The reliance of one task upon the completion of another is similar to the reliance on a particular resource. Thus completed tasks may also be handled as items for negotiation, and the negotiating teams will dynamically create a hierarchy of inter-dependencies and cooperation. In this way, higher-level teams will result as an emergent phenomenon of the ANT approach. FIG. 5 provides an illustration of an ANT hierarchy 5001.

Once negotiations for resources have been settled and the distributed PN graph is established, intelligent agents will perform an accurate and efficient search of the PN graph to find paths that lead to a solution. "Good enough, fast enough" solutions are required for planning routes through the graph, from the initial conditions to the objectives, that attempt to minimize costs and maximize rewards. A number of novel computational geometry techniques have been developed that involve intelligent partitioning of the search space. This partitioning allocates probabilities of high and low reward, allowing automatic pruning of undesirable (low probable reward) portions of the graph. The search is further accelerated by the supervisory control structures incorporated in the PN graph. These automatic resource management and deadlock avoidance structures will have already pruned infeasible solutions from the reachable search space of the graph.

The cooperation among teams, negotiation for resources, and search for paths to the mission objectives are dynamic, capable of responding to changes in the problem domain and adapting the resultant ANT behavior. Resources may be lost or destroyed, or other forms of attrition may occur that remove subtasks from the distributed PN graph. Alternately, new tasks may be introduced into the mission. Teams may also detect new information about the environment, such as determining the presence of a previously unknown threat. Any of these events will automatically initiate new rounds of negotiation between teams, and new paths to the mission objectives will be developed. The ANT architecture (see FIG. 1) allows these events to be handled autonomously by the individual teams, without requiring communication with a central authority.

The environmental partitioner/central planner may also become involved in dynamically responding to changing situations. If new capabilities become available for the mission, the planner will compose these potential tasks and resources and indicate that a new round of negotiation and search should begin. If sensor and communications capabilities permit, the planner may also re-evaluate the current mission situation and introduce strategic changes into ANT behavior. Relaying new resource costs and objective rewards will induce new negotiations that account for the changed priorities.

The ANT architecture is an interdisciplinary solution to the problem of autonomous teams employing scalable resource negotiations. The areas of computational geometry and graph search bring novel routines to partition application-specific problem domains, compose mission objectives from modular subtask descriptions, and intelligently assign resource costs and objective rewards. ANT representations benefit from cutting-edge, scalable, resource-management techniques from the area of discrete event systems. Advances in supervisory control theory bring revolutionary, integrated deadlock avoidance techniques, required to improve the quality of ANT solutions.

There are a number of different ways to handle the engineering specifics of the interaction between agents, including Java Applets, the Task Network Architecture, and the Object Management Group's (OMG) Common Object Request Broker Architecture (CORBA). The Modular Semi-Automated Forces (ModSAF) simulation environment provides an excellent tool kit for simulating autonomous teammates in a variety of real-world scenarios.

Figure 6:
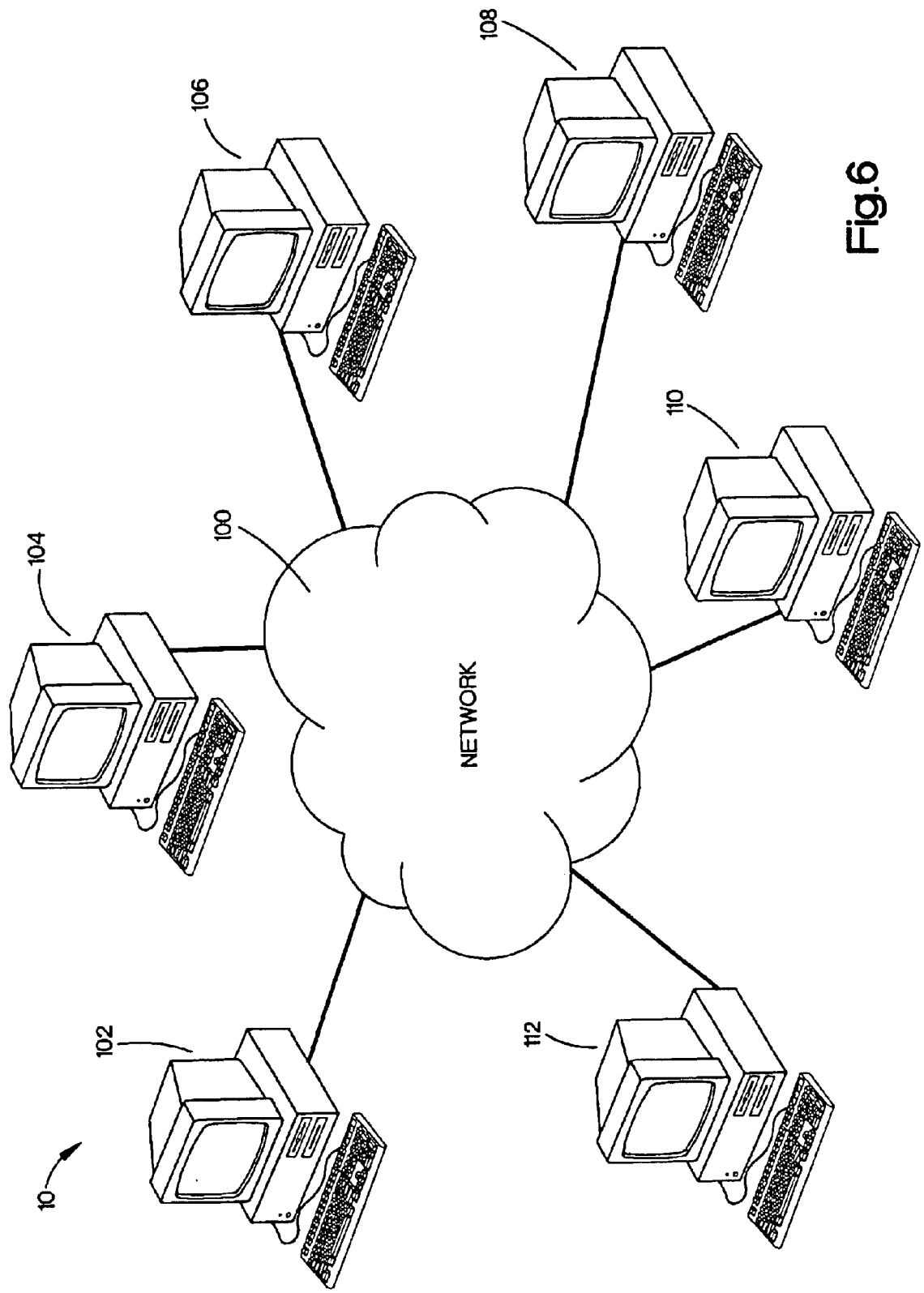
FIG. 6 illustrates a network having central authority and agent machines connected thereto.
Figure 7:
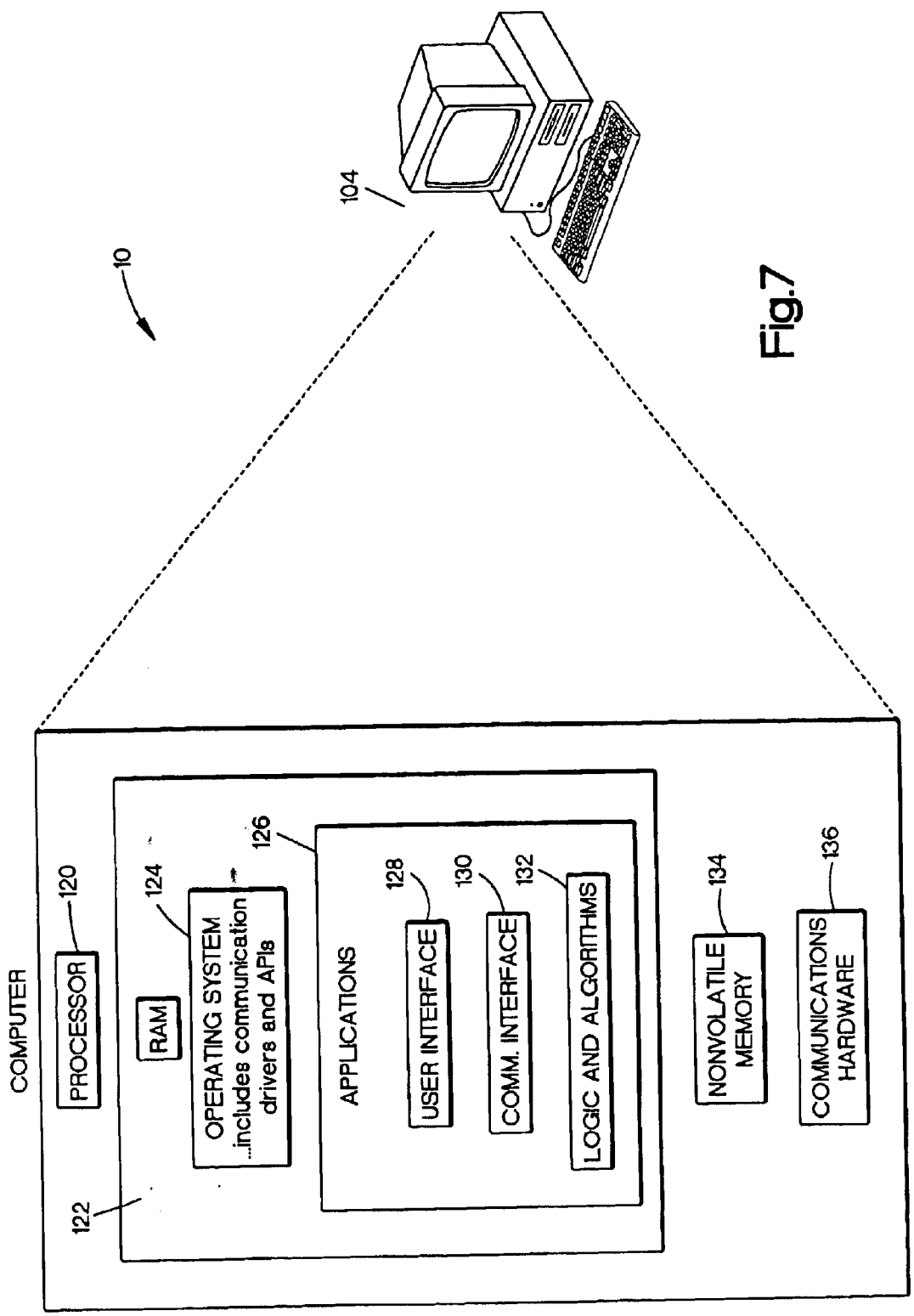
FIG. 7 is a graphical illustration indicative of the hardware employed in each of the computers connected to the network of FIG. 6.

Reference is now made to FIGS. 6 and 7 that illustrate hardware employed in practicing the invention. FIG. 6 illustrates a distributed data processing system 10 in accordance with the invention for purposes of controlling allocation of resources employed in performing various tasks. In the embodiment illustrated, the system includes a communications network 100 for purposes of passing messages between various computers connected to the network. The computers are sometimes referred to as "machines". As shown in FIG. 6, several computers 102, 104, 106, 108, 110 and 112 are shown as being connected to the network 100. These computers house software algorithms, sometimes referred to as programs or routines. One of the computers runs the central authority (strategic layer) and the others run the autonomous agents (tactical layers). For purposes of illustration only, computer 102 may run the central authority and the other computers may run agents. If desired, two agents may be run on the same computer. The network may be any type of network that allows the computers to send and receive messages, however, the preferred network takes the form of a local area network (LAN) or the internet, using the transmission control protocol/internet protocol (TCP/IP). The agents may operate at remote locations, apart from the central authority.

The central authority and the agents may be run on computers having similar capabilities. An example of one of the computers, such as computer 104, is illustrated in FIG. 7. As shown there, the computer 104 conventionally includes a processor 120, a memory in the form of a random access memory (RAM) 122. The RAM 122 contains an operating system 124 and various applications 126 including a user interface 128, a communication interface 130 and logic and algorithms 132. The computer 104 also includes a non-volatile memory 134 and suitable communications hardware 136. It is to be appreciated that the programs for the central authority and the agents may be run on various computers which may be structured similar to or different from computer 104 as illustrated in FIG. 7.

Reference is again made to FIG. 1 which presents a high level description 1001 of the distributed algorithm performed by the central authority and the autonomous agents. The upper half of the figure represents the strategic layer 1100 and this may be performed by a program running on a single machine employed for the central authority. The bottom half of the figure represents the tactical layer 1200 and this is likely to be performed by programs running on multiple machines, the autonomous agents. Communication between the various entities is handled by passing messages over the network 100 (FIG. 6).

Figure 8:
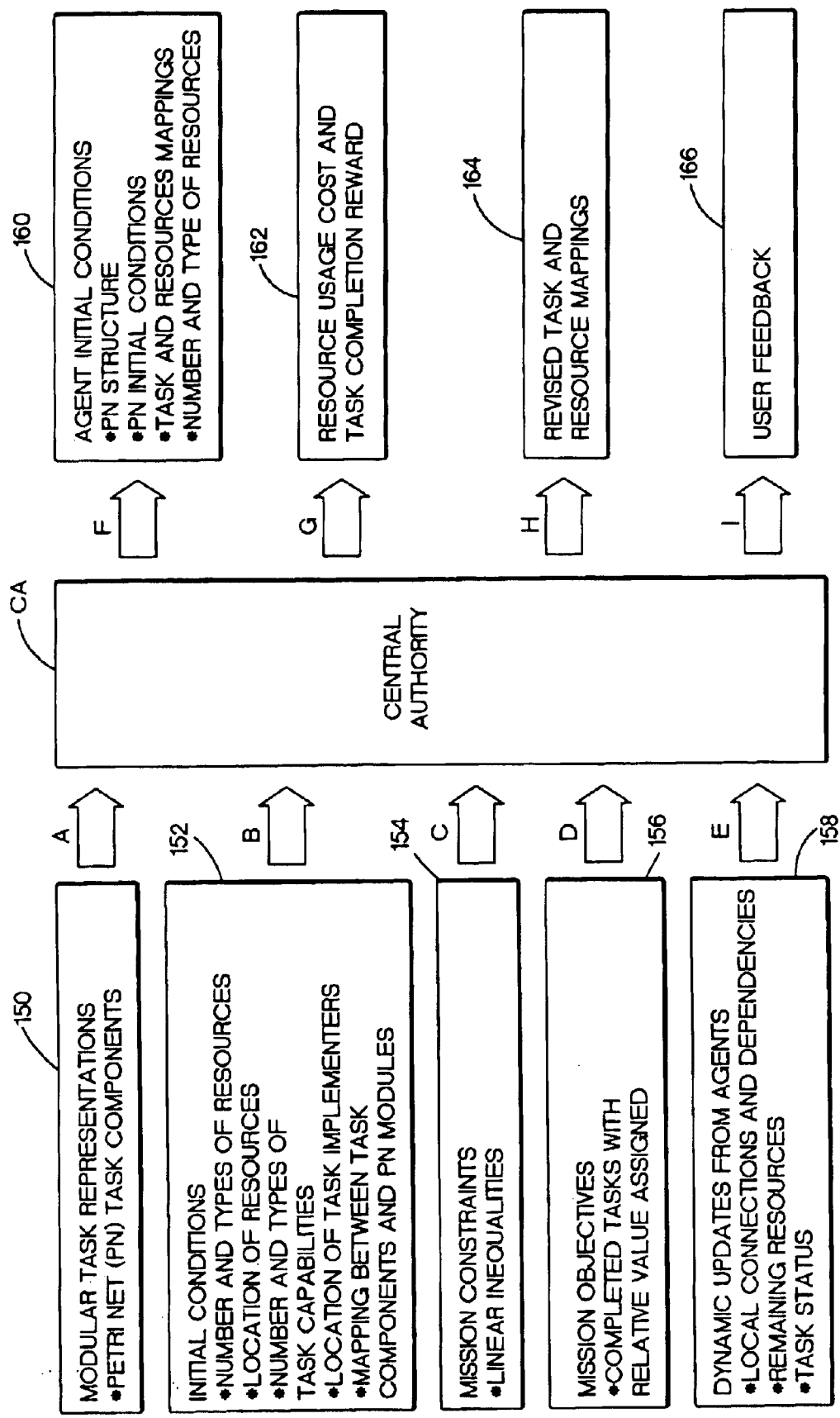
FIG. 8 is a graphical illustration of the strategic layer-central authority showing various inputs and outputs.

Reference is now made to FIG. 8 which illustrates the various types of data supplied as inputs (A, B, C, D, E) to the central authority (CA) and the various types of data provided as outputs (F, G, H, I) from the central authority (CA). The inputs are indicated by the arrows A, B, C, D and E and the outputs are indicated by the arrows F, G, H and I. The data supplied to the inputs A–D may be provided by a suitable data source, such as another machine, or perhaps may be entered at a keyboard of the computer 102 (FIG. 6) that runs the central authority (CA). The data that is supplied at input E is received from the agents in this system. There are different types of data being applied to the inputs and for example the data supplied to input A, as indicated by the box 150, includes modular task representations including Petri Net (PN) task components. This may also be considered as data representing Petri Net models of tasks which are mapped to task types. As shown in box 152, the data supplied to input B represents input conditions including the number and types of resources, the location of resources, the number and types of task capabilities, the location of task implementers and mapping between task components and PN modules. As indicated at box 154, the data supplied to input C includes mission constraints including linear inequalities. As shown in Box 156, the data supplied to input D includes mission objectives including completed tasks with relative values assigned. The data being supplied to input E is indicated by box 158. This includes dynamic updates from the agents including local connections and dependencies, the remaining resources, and the task status.

Box 160 in FIG. 8 represents the type of data provided at output F of the central authority CA. This data is directed to agent initial conditions including PN structure, PN initial conditions, task and resource mappings and the number and type of resources. The central authority generates a graph (PN graph) associated with each agent and wherein the graph represents for the associated agent what resources that agent has and what task or tasks that agent may perform.

Box 162 in FIG. 8 indicates the type of data provided at output G of the central authority. This data includes resource usage cost and task completion reward.

Box 164 in FIG. 8 illustrates the type of data provided at output H of the central authority. This includes revised tasks and resource mappings. The data from outputs F, G and H of the central authority CA are supplied to each of the agents AG-1 through AG-n as will be appreciated with reference to FIG. 10 to be described hereinafter.

Box 166 indicates the type of data provided by output I and this includes user feedback. This, for example, may be a video display at the computer that runs the central authority so that the operator may receive a message.

Figure 9:
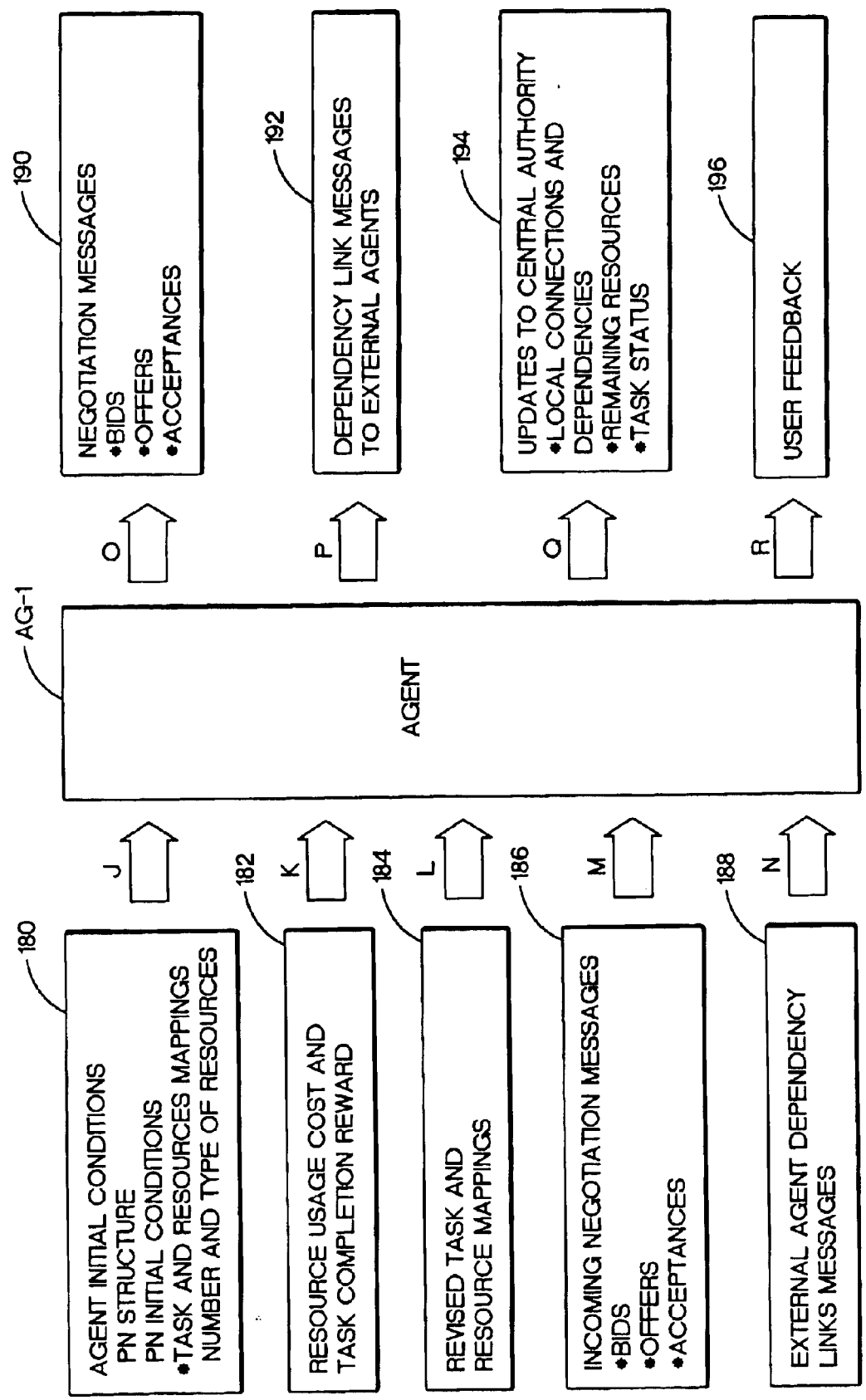
FIG. 9 is a graphical illustration of the tactical layer-autonomous agents showing various inputs and outputs.

All of the autonomous agents may be essentially the same. Reference is now made to FIG. 9 which illustrates agent AG-1, it being understood that the description is equally applicable to the other agents AG-2 . . . AG-n.

Agent AG-1 has inputs J, K, L, M and N and outputs O, P, Q and R. The inputs J, K and L are received from the central authority CA. These inputs include the agent initial conditions shown in block 180 and applied to input J. The agent initial conditions include PN structure, PN initial conditions, task and resource mappings and the number and type of resources. Block 182 shows the data being applied to input K of the agent. This block 182 includes resource usage costs and task completion reward. Block 184 shows the data supplied to the input L and this includes revised task and resource mappings. Block 186 shows the data that is supplied to input M. This block 186 illustrates the incoming negotiating messages received from other agents. The incoming negotiation messages includes bids, offers and acceptances. Block 188 shows the data that is supplied to the input N and this data is received from other agents and includes external agent dependency link messages.

FIG. 9 also illustrates the data supplied at the various outputs O, P. Q and R of agent AG-1. Block 190 shows the negotiation messages provided at output O of agent AG-1 and these messages are forwarded to other agents. These messages include bids, offers and acceptances. Block 192 illustrates data provided at output P of agent AG-1. These messages are forwarded to other agents at their inputs 188. These messages at output P include dependency link messages to external agents. Block 194 shows data provided at output Q of agent AG-1. This includes updates to the central authority CA including local connections and dependencies, remaining resources and task status. This is supplied at input E of the central authority CA (FIG. 8). Block 196 shows the data supplied at the output R of agent AG-1 and this includes user feedback. This could be a message or other data and for example may be supplied to a machine controlled by the agent.

Figure 10:
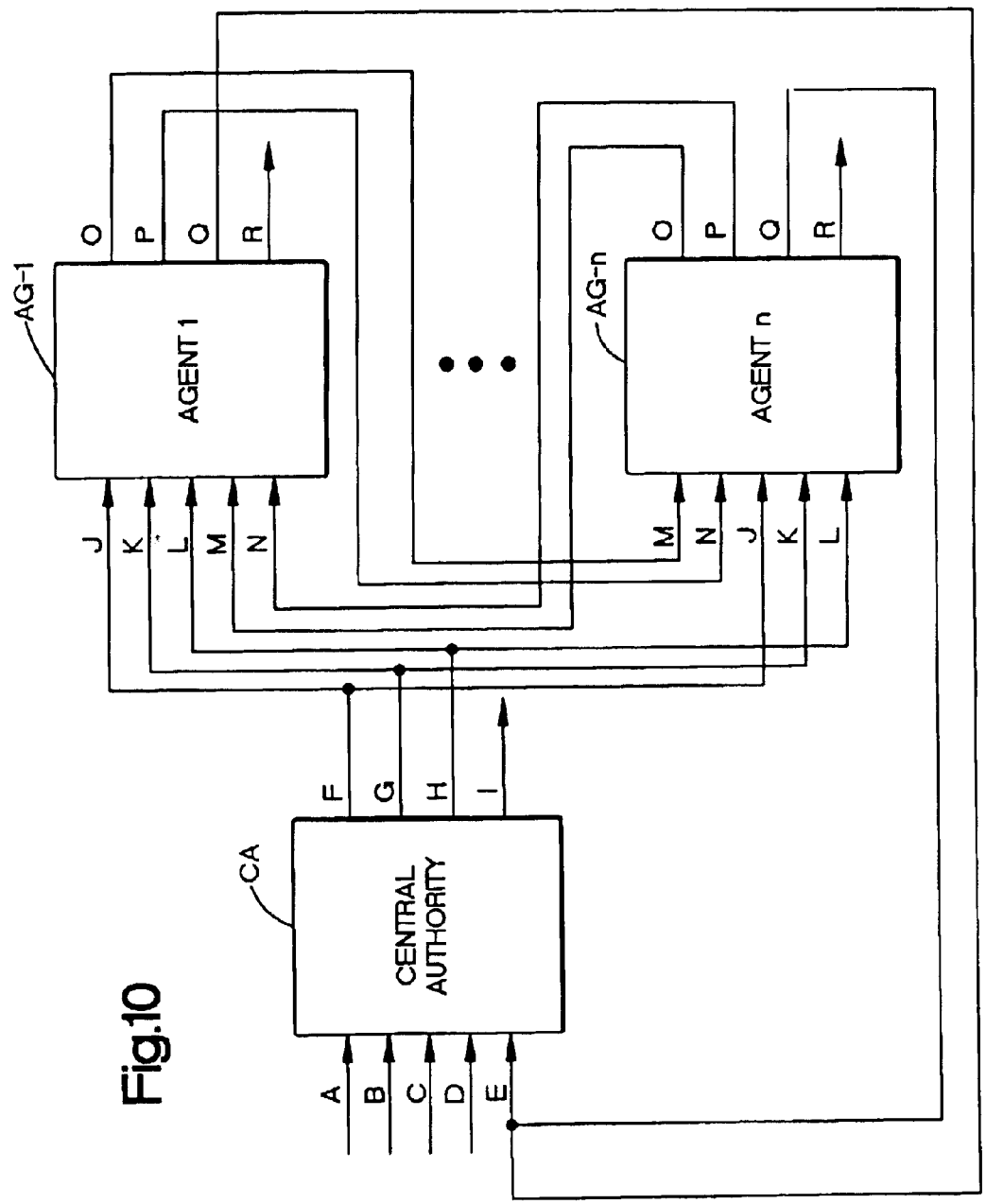
FIG. 10 is an overall illustration of the relationship and flow between the central authority and autonomous agents.

Reference is now made to FIG. 10 which illustrates a flow diagram (not a wiring diagram) showing the manner in which the central authority outputs F, G, H and I are supplied to the inputs J, K and L, of the various agents and the manner in which the outputs O, P and Q of the various agents are supplied to the other agents as well as to the central authority CA.

Figure 11:
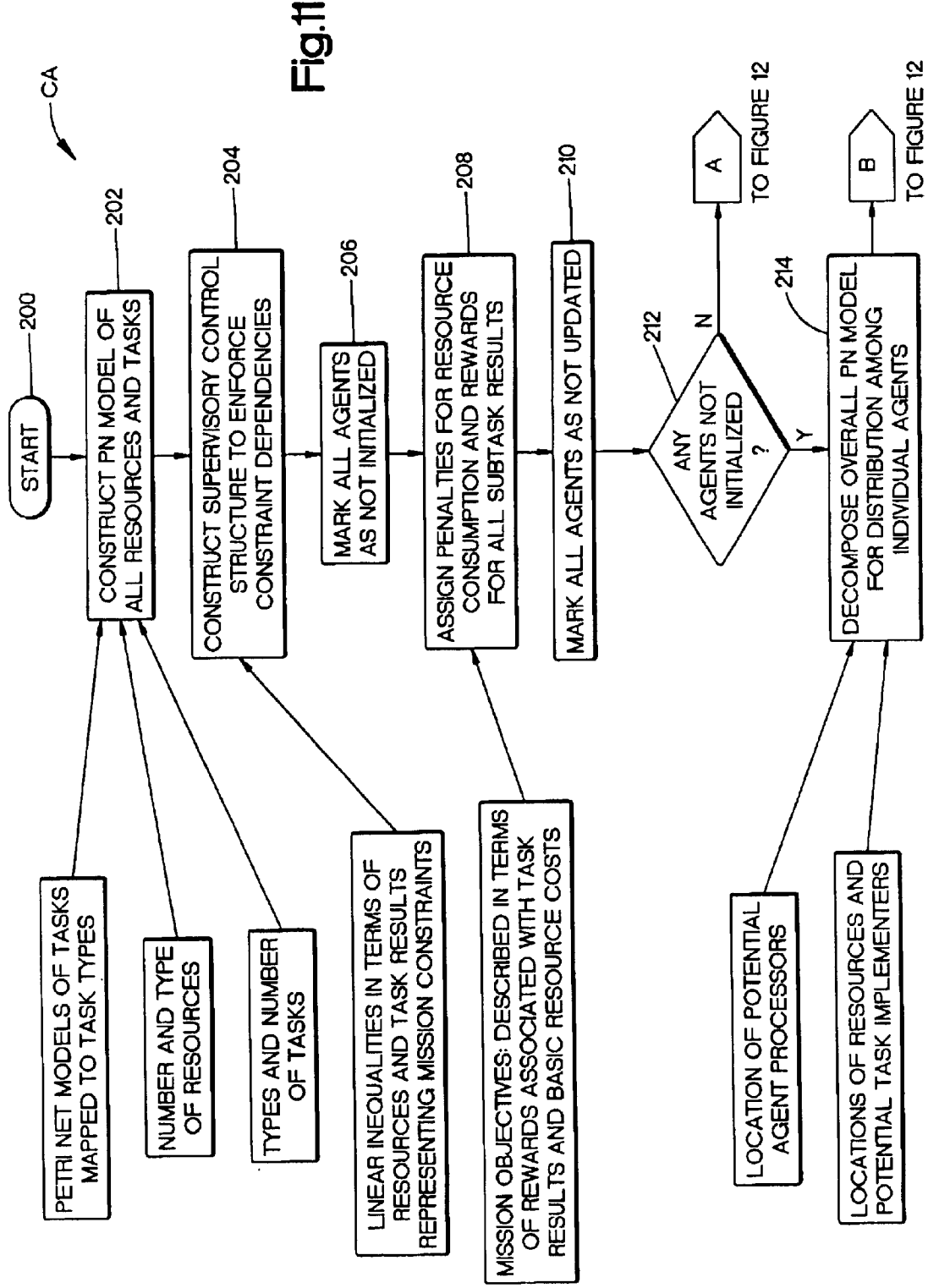
FIG. 11 is a flow diagram of Part 1 of the strategic layer-central authority.
Figure 12:
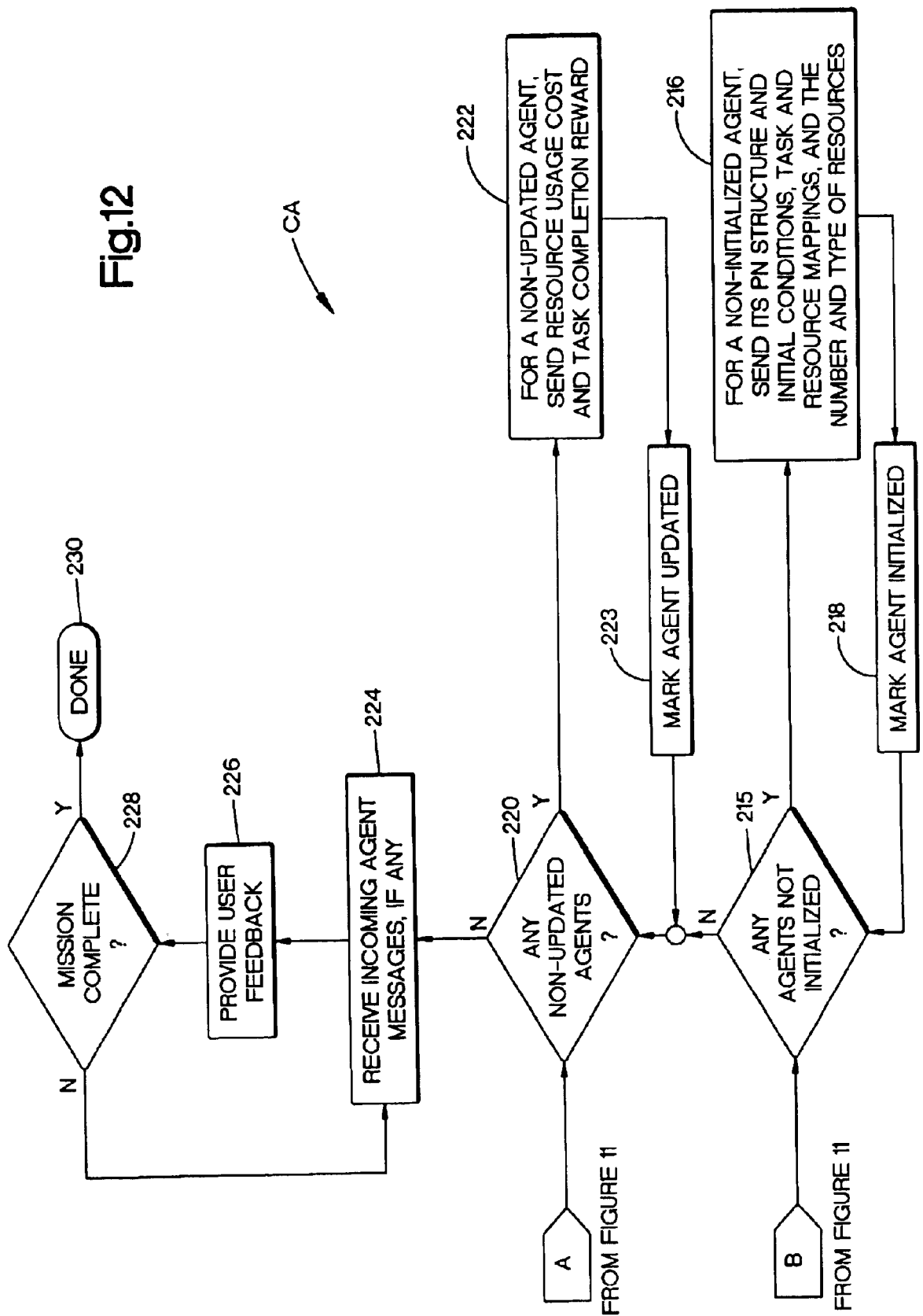
FIG. 12 is a flow diagram illustrating Part 2 of the strategic layer-central authority.

Reference is now made to FIGS. 11 and 12 which together present a flow diagram of the central authority CA. Part 1 of the central authority is illustrated in FIG. 11 and Part 2 is illustrated in FIG. 12.

The program commences at step 200 and advances to step 202. In step 202, the program constructs a PN model of all resources and tasks based on data that has been entered at its inputs A and B (FIG. 8) and this includes Petri Net models of tasks mapped to task types, number and type of resources and types and number of tasks. The program then advances to step 204.

In step 204, the program constructs supervisory control structure to enforce constraint dependencies based on step 202, as well as data that was supplied to input C (FIG. 8) including mission constraints with linear inequalities in terms of resources and task results representing mission constraints. The program advances to step 206 during which all agents are marked as not initialized. The program then advances to step 208.

In step 208, data is obtained regarding mission objectives described in terms of rewards associated with task results and basic resource costs. During step 208, penalties are assigned for resource consumption and rewards are assigned for all subtask results. Penalties correspond to real world quantities, such as price, time, labor or availability of resources. Rewards correspond to the value of completing a task. It is possible that only one task, that representing the completed over all objective, will have a reward. The autonomous agents will deduce new reward values that lead to the completion of the objective through their negotiation process. The program then advances to step 210.

In step 210, all agents are marked as not updated. The program then advances to step 212.

In step 212, a determination is made as to whether any agents are not initialized. If the answer is yes, the program advances to step 214. In step 214, data is received representing the locations of potential agent processors and locations of resources and potential task implementers. In step 214, the program decomposes an overall PN model for distribution among individual agents. The program then advances to step 215 (see FIG. 12).

In step 215, a determination is made as to whether any agents are not initialized. If the determination is yes, the program advances to step 216. In step 216, for a non-initialized agent, the program sends its PN structure and initial conditions, task and resource mappings and the number and type of resources. The program advances to step 218 at which the agent is marked as initialized. Then the program advances to step 215. Since the determination at step 215 will now be negative, the program will advance to step 220. Step 220 may also be reached from step 212 (FIG. 11) if a negative determination was made at step 212. In step 220, a determination is made as to whether there are any non-updated agents. If the answer is yes, the program advances to step 222. In step 222, for a non-updated agent, the program sends resource usage costs and task completion reward data and the program advances to step 223. In step 223, the agent is marked as being updated and the program advances to step 220. Since the determination is now negative at step 220 the program advances to step 224.

In step 224, the program receives any incoming agent messages and then advances to step 226. In step 226, the program provides user feedback such as that discussed hereinbefore with reference to block 166 (FIG. 8) relative to the output I of the central authority CA. The program then advances to step 228.

In step 228, a determination is made as to whether the mission is complete. If not, the procedure returns to step 224 and repeats steps 224, 226 and 228. When the determination at step 228 is yes and the mission has been completed, the program is done as indicated by the "done" step 230.

Figure 13:
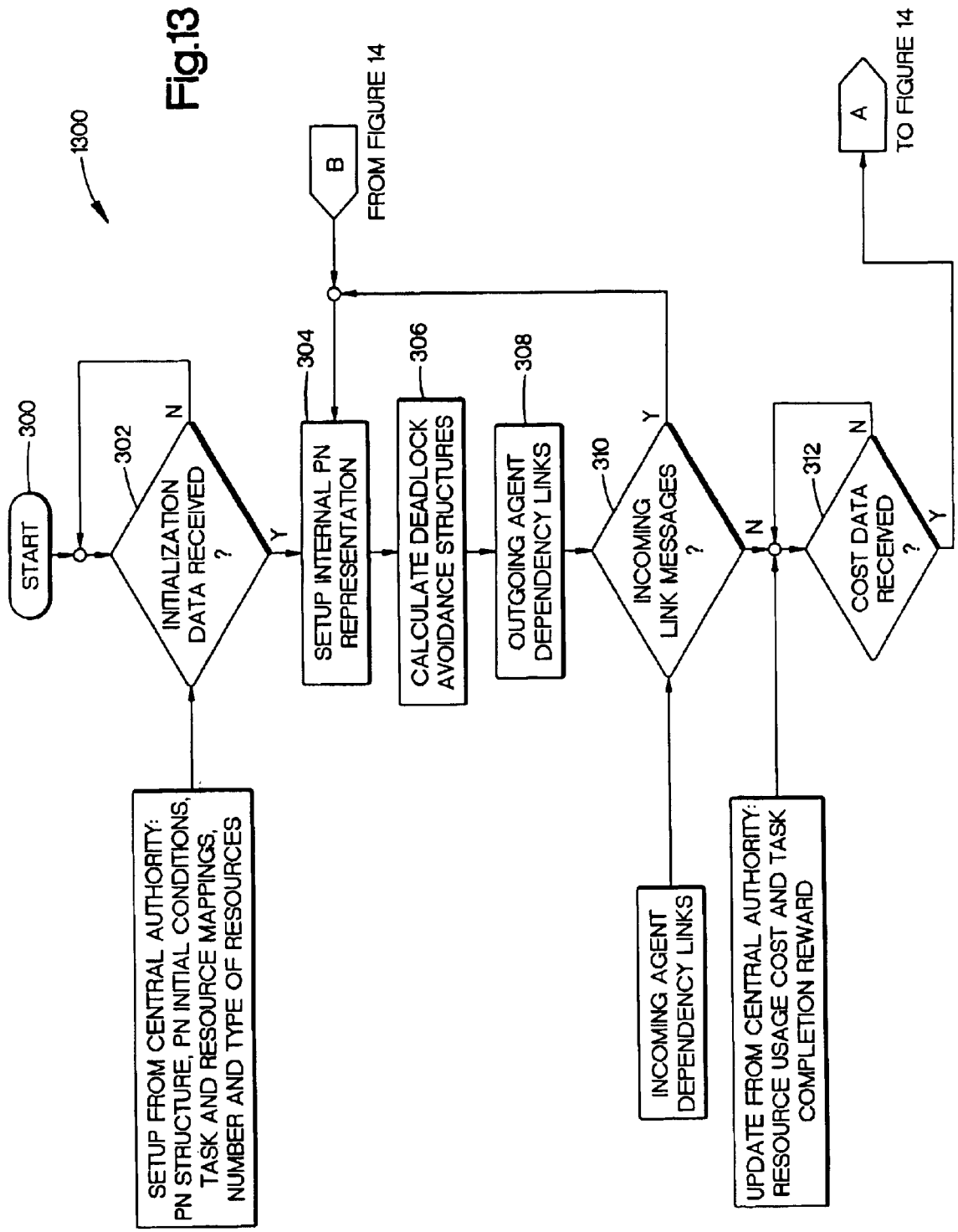
FIG. 13 is a flow diagram illustrating Part 1 of the tactical layer-autonomous agents; and, FIG. 14 is a flow diagram illustrating Part 2 of the tactical layer-autonomous agents.
Figure 14:
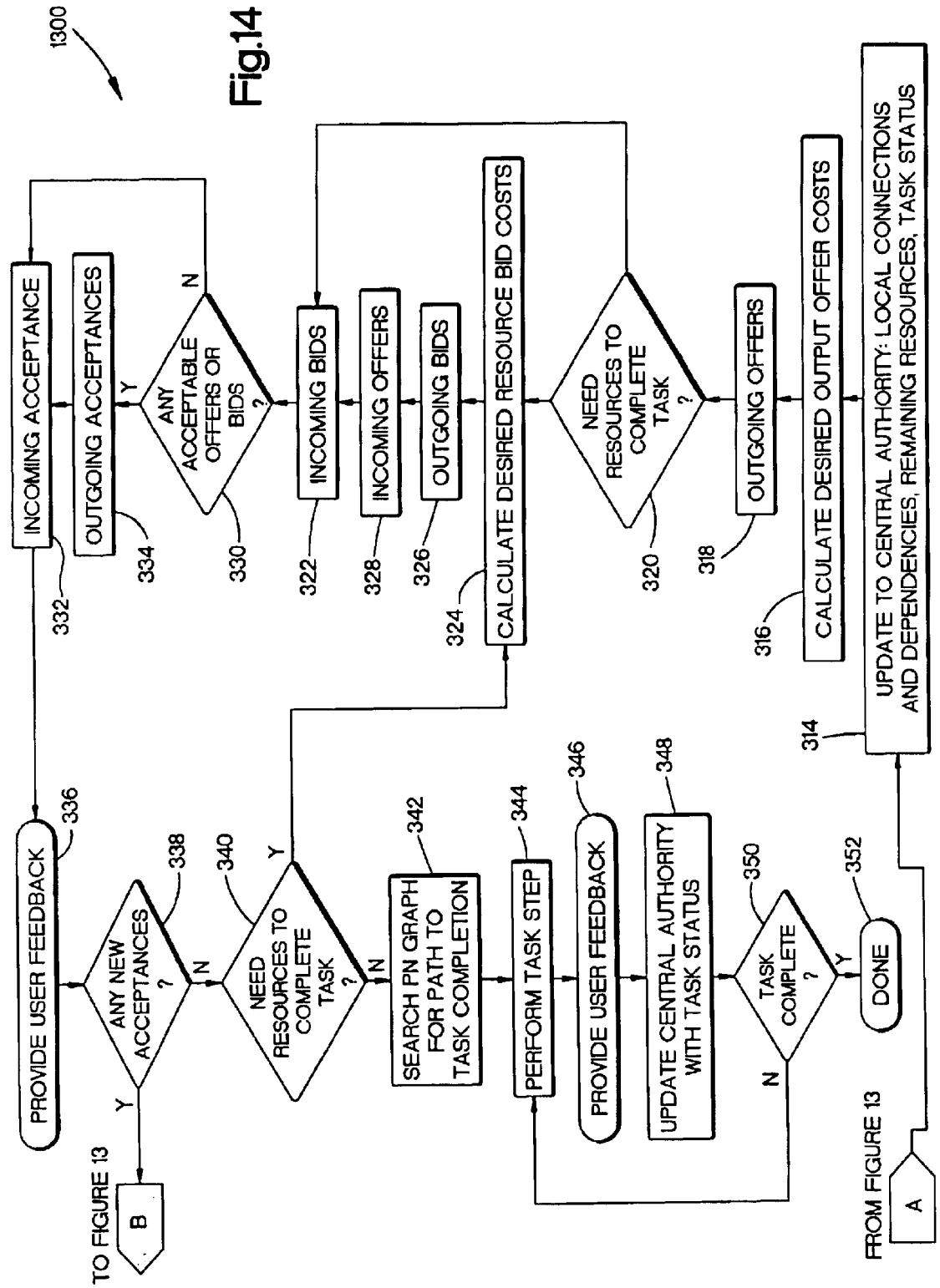

Attention is now directed to FIGS. 13 and 14 which respectively represent Part 1 and Part 2 of the program 1300 for the autonomous agents.

This program 1300 commences at step 300 and advances to step 302. In step 302, data is supplied from the central authority CA relative to the set up conditions. Further in step 302, a determination is made as to whether initialization data has been received. This data includes the set up from the central authority including the PN structure, PN initial conditions, task and resource mappings and number and type of resources. If the data has not been received, then the program repeats. If the data has been received, the program advances to step 304.

In step 304, the program provides setup of internal PN representation based on the decision from step 302 as well as that from step 310 and step 338 (FIG. 14) to be described in detail hereinafter. The program advances to step 306. In step 306, the program calculates deadlock avoidance structures and proceeds to step 308. In step 308, outgoing agent dependency links are forwarded and the program advances to step 310. In step 310, a determination is made as to whether any incoming agent dependency link messages have been received. If yes, then the procedure returns to step 304 and steps 304, 306 and 308 are repeated.

If the determination in step 310 is no, then the program advances to step 312 during which a determination is made as to whether cost data has been received. This is data from the central authority which is an update dealing with resource usage cost and task completion rewards. If the determination in step 310 is negative, the program repeats. If the determination at step 312 is affirmative, the program advances to step 314 (FIG. 14).

In step 314, the agent sends updates to the central authority including local connections and dependencies, remaining resources and task status. The program then advances to step 316. Step 314 is not a blocking step. If the agent cannot communicate with the central authority it will still advance to step 316.

In step 316, the agent calculates the desired output offer costs and the program advances to step 318. In step 318, the agent forwards outgoing offers and the program advances to step 320.

In step 320, a determination is made as to whether the agent needs additional resources to complete the task. If not, the program advances to step 322 at which the agent receives incoming bids. In step 322, the agent will increase the reward value associated with completing a task to match the value of the highest incoming bid for that task completion. If the answer to the determination in step 320 is affirmative, the agent needs to negotiate with other agents to obtain resources. The program advances to step 324 during which the agent calculates the desired resource bid costs and the procedure advances to step 326.

In step 326, the agent forwards outgoing bids to other agents and advances to step 328 in which the agent receives incoming offers from other agents. The program then advances to step 322 in which the agent receives incoming bids and the program advances to step 330.

In step 330, the agent determines whether there have been any acceptable offers or bids. Acceptable offers must be equal to or less than the current reward value for completing the given task. Acceptable bids must equal or exceed the cost to obtain the necessary resources to complete the task. If there are no acceptable offers or bids, the program advances to step 332. In step 332, the agent receives incoming acceptances. If the determination in step 330 is affirmative, the program advances to step 334 during which the agent provides outgoing acceptances.

After step 332, the program advances to step 336. In step 336, feedback is provided to the user in the nature described before with reference to output R of the agent AG-1. The program then advances to step 338.

In step 338, a determination is made as to whether there are any new acceptances. If yes, the program returns to step 304 (FIG. 13) and steps 306–336 are repeated.

If the answer in determination 338 is no, the program advances to step 340. In step 340, the agent determines whether any resources are needed to complete the task. If yes, the program returns to step 324 during which the agent calculates the desired resource bid costs and steps 326–340 are repeated.

If the determination in step 340 is no, the program advances to step 342. In step, 342, the agent searches the PN graph for a path to task completion. The program then advances to step 344. In step 344, the agent performs the task and the program advances to step 346.

In step 346, the agent provides the user with feedback such as that with reference to output R of the agent AG-1 described previously. After step 346, the program advances to step 348. During step 348, the agent updates the central authority with the task status and the program advances to step 350.

In step 350, the agent determines whether the task is complete. If so, the program is complete as indicated by step 352 for done. If in step 350 the task was not complete, the program returns to step 344 and steps 344–350 are repeated.

An architecture in accordance with the present invention establishes, from the top down, a framework for different operating agents each capable of performing tasks and/or holding resources, each task requiring the use of resources. Members of teams may include computers, other cooperating agents or people operating computers. Certain resources may be shared with, or allocated to, another agent in order to perform their tasks. The strategic layer assigns costs and rewards for consuming resources and completing tasks, and may compose subtasks into higher level tasks that lead toward the completion of mission goals. At the tactical level, the model that represents the task flow may be augmented to include the dependencies that are associated with resource consumption. The model is augmented to assure that paths from start to finish are achievable, i.e., capable of completion without achieving a state of deadlock. The tactical layer goes on to include negotiation between different agents for resources based on task completion and the cost of resources. After negotiation is complete, a path is searched from starting point to achievement of mission goals.

Although the invention has been described in conjunction with the preferred embodiments, it is to be appreciated that various modifications may be made without departing from the spirit and scope of the invention as defined by the appended claims.

What is claimed is:

1. A distributed data processing system for controlling allocation of resources and controlling task execution, said system comprising:

a communications network for transmitting messages;
a plurality of computers connected to said communications network for executing programs, said plurality of computers including a central authority computer, a first autonomous agent computer, and a second autonomous agent computer;
said central authority computer generating a first graph associated with said first agent computer and a second graph associated with said second agent computer, said first graph representing resources and performable tasks of said first agent computer, said second graph representing resources and performable tasks of said second agent computer, said first agent computer employing said first graph to determine resources necessary for performing tasks required by said first agent computer, said second agent computer employing said second graph to determine resources necessary for performing tasks required by said second agent computer, said first agent computer negotiating with said second agent computer for obtaining resources necessary for executing tasks required by said first agent computer, said second agent computer negotiating with said first agent computer for obtaining resources necessary for executing tasks required by said second agent computer, said central authority computer receiving mission objectives described in terms of rewards associated with task results and costs described in terms of consumption of basic resources.

2. A system as set forth in claim 1 wherein said central authority computer generates said first and second graphs from data representing models of tasks mapped to task types.

3. A system as set forth in claim 1 wherein said central authority computer generates said first and second graphs from data representing number and type of resources.

4. A system as set forth in claim 1 wherein said central authority computer generates said first and second graphs from data representing number and type of tasks.

5. A system as set forth in claim 4 wherein said data includes models of tasks mapped to task types and number and type of resources.

6. A system as set forth in claim 1 wherein said central authority computer receives data representing mission constraints, said data including linear inequalities in terms of resource and task results.

7. A system as set forth in claim 6 wherein said central authority computer generates a supervisory control structure for enforcing constraint dependencies based on data representing mission constraints and said first and second graphs.

8. A system as set forth in claim 7 wherein said data further represents models of tasks mapped to task types, number and type of resources, and number and type of tasks.

9. A system as set forth in claim 1 wherein said central authority computer assigns penalties for resource consumption and rewards for subtask results based on data representing mission objectives.

10. A system as set forth in claim 9 wherein said central authority computer receives data representing locations of potential agent processors, locations of resources, and locations of potential task implementers.

11. A system as set forth in claim 10 wherein said central authority computer decomposes an overall model for distribution among the said first and second agent computers.

12. A system as set forth in claim 11 wherein said central authority computer determines whether said first agent computer and said second agent computer have received initial data, said central authority computer sending the initial data to said first agent computer if said first agent computer has not received the initial data, said central authority computer sending the initial data to said second agent computer if said second agent computer has not received the initial data.

13. A system as set forth in claim 12 wherein said central authority computer determines if said first agent computer has not been updated, and if not, said central authority computer sends to said first agent computer data regarding resources, usage costs, and task completion rewards.

14. A system as set forth in claim 13 wherein said central authority computer receives incoming messages from said first agent computer and provides user feedback to said first agent computer.

15. A system as set forth in claim 14 wherein said central authority computer determines whether a mission has been completed.

16. A method operative in a distributed data processing system, said method comprising the steps of:

controlling allocation of resources;

controlling task execution;

employing a communications network for passing messages between computers, the computers being operative to run programs, the computers including a central authority computer, a first autonomous agent computer, and a second autonomous agent computer;

generating a first graph associated with the first agent computer, the first graph representing resources and tasks for the first agent computer;

generating a second graph associated with the second agent computer, the second graph representing resources and tasks for the second agent computer;

employing the first graph by the first agent computer to determine resources required to perform tasks;

employing the second graph by the second agent computer to determine resources required to perform tasks;

negotiating with the second agent computer by the first agent computer for resources required to perform tasks;

negotiating with the first agent computer by the second agent computer for resources required to perform tasks; and assigning, by the central authority computer, penalties for resource consumption and rewards for subtask results based on data representing mission objectives described in terms of rewards associated with task results and basic resource costs.

17. A method as set forth in claim 16 wherein said generating steps include generating the first and second graphs from data representing models of tasks mapped to task types.

18. A method as set forth in claim 17 wherein said generating steps include generating the first and second graphs from data representing number and type of resources.

19. A method as set forth in claim 18 wherein the first and second graphs include data representing models of tasks mapped to task types.

20. A method as set forth in claim 16 wherein the central authority computer generates supervisory control structure to enforce constraint dependencies based on data representing linear inequalities in terms of resources and task results and data representing mission constraints.

21. A method as set forth in claim 20 wherein the central authority computer decomposes an overall graph for distribution among the first and second agent computers based on data representing locations of potential agent processors, locations of resources, and locations of potential task implementers.

22. A method as set forth in claim 21 further including the step of determining whether the first and second agent computers have been initialized and, if not, sending it structure, initial conditions, task and resource mappings, and the number and type of resources to the first and second agent computers.

23. A method as set forth in claim 22 further including the step of determining whether the first and second agent computers have been updated and, if not, sending resource usage cost data and task completion reward data to the first and second agent computers.

24. A method as set forth in claim 23 further including the steps of:

receiving incoming messages;

providing user feedback data; and determining whether a mission has been completed.

25. A computer program product stored in a computer readable medium, said product being operative in a distributed data processing system for controlling allocation of resources and for controlling task execution, the system including a communications network, said product comprising:

a central authority node;

a first autonomous agent node; and a second autonomous agent node, said central authority node generating a first graph for said first agent node and a second graph for said second agent node, said first graph representing resources and tasks for said first agent node, said second graph representing resources and tasks for said second agent node, said first agent node employing said first graph for determining required resources for performing tasks by said first agent node, said second agent node employing said second graph for determining required resources for performing tasks by said second agent node, said first agent node negotiating with said second agent node for resources required to perform tasks by said first agent node, said second agent node negotiating with said first agent node for resources required to perform tasks by said second agent node, said central authority node receiving data representing mission objectives described in terms of rewards associated with task results and costs described in terms of consumption of basic resources.

26. A product as set forth in claim 25 wherein said central authority node generates said first and second graphs from data representing models of tasks mapped to task types.

27. A product as set forth in claim 25 wherein said central authority node generates said first and second graphs from data representing number and type of resources.

28. A product as set forth in claim 25 wherein said central authority node generates said first and second graphs from data representing number and type of tasks.

29. A product as set forth in claim 28 wherein said data represents models of tasks mapped to task types and number and type of resources.

30. A product as set forth in claim 25 wherein said central authority node receives data representing mission constraints, said data including linear inequalities in terms of resources and task results.

31. A product as set forth in claim 30 wherein said central authority node generates supervisory control structure to enforce constraint dependencies based on data representing said mission constraints and said first and second graphs.

32. A product as set forth in claim 25 wherein said central authority node receives data representing mission constraints, said data including linear inequalities in terms of resources and task results.

33. A product as set forth in claim 32 wherein said central authority node generates supervisory control structure to enforce constraint dependencies based on data representing said mission constraints and said first and second graphs.

34. A product as set forth in claim 32 wherein said data represents models of tasks mapped to task types and number and type of resources.

35. A product as set forth in claim 25 wherein said central authority node assigns penalties for resource consumption and rewards for subtask results based on mission objectives.

36. A product as set forth in claim 35 wherein said central authority node receives data representing locations of potential agent processors, locations of resources, locations of potential agent processors, locations of resources, and locations of potential task implementers.

37. A product as set forth in claim 36 wherein said central authority node decomposes an overall model for distribution among said first and second agent nodes.

38. A product as set forth in claim 37 wherein said central authority node determines whether said first and second agent nodes have received initial data, and if not, said central authority node sends structures, initial conditions, task and resource mappings, and number and type of resources to said first and second agent nodes.

39. A product as set forth in claim 38 wherein said central authority node determines whether said first and second agent nodes have been updated, and if not, said central authority node sends resource usage costs and task completion rewards to said first and second agent nodes.

40. A product as set forth in claim 39 wherein said central authority node receives incoming messages from said first agent node and provides user feedback to said first agent node.

41. A product as set forth in claim 40 wherein said central authority node determines whether a mission has been completed.

* * * * *

UNITED STATES PATENT AND TRADEMARK OFFICE
CERTIFICATE OF CORRECTION

PATENT NO. : 6,859,927 B2
DATED : February 22, 2005
INVENTOR(S) : John O. Moody, Ira Glickenstein and Robert Szczerba It is certified that error appears in the above-identified patent and that said Letters Patent is hereby corrected as shown below:

Column 16,
Line 59, after "sending" delete "it".

Signed and Sealed this

Seventh Day of June, 2005

JON W. DUDAS
*Director of the United States Patent and Trademark Office*